(12) United States Patent  (10) Patent No.: US 7,690,190 B2
Thornock et al.  (45) Date of Patent: Apr. 6, 2010

(54) AIRCRAFT SYSTEMS INCLUDING CASCADE THRUST REVERSERS

(75) Inventors: Russel L. Thornock, Seattle, WA (US); Michael L. Sangwin, Seattle, WA (US); Entsung Hsiao, Seattle, WA (US)

(73) Assignee: The Boeing Company, Chicago, IL (US)

( * ) Notice: Subject to any disclaimer, the term of this patent is extended or adjusted under 35 U.S.C. 154(b) by 910 days.

(21) Appl. No.: 11/127,424

(22) Filed: May 11, 2005

(65) Prior Publication Data
US 2006/0277895 A1 Dec. 14, 2006

(51) Int. Cl.
*F02K 3/02* (2006.01)
(52) U.S. Cl. ............... 60/226.2; 60/230; 239/265.29
(58) Field of Classification Search ............... 60/226.2, 60/230; 244/110; 239/265.29
See application file for complete search history.

(56) References Cited

U.S. PATENT DOCUMENTS

| | | | |
|---|---|---|---|
| 3,500,644 A | 3/1970 | Hom et al. |
| 3,600,023 A | 8/1971 | Gudde |
| 3,762,667 A | 10/1973 | Pender |
| 3,824,785 A | 7/1974 | Soligny et al. |
| 4,044,973 A | 8/1977 | Moorehead |
| 4,283,028 A | 8/1981 | Wilke |
| 4,286,727 A | 9/1981 | Limoncelli |
| 4,365,775 A | 12/1982 | Glancy |
| 4,549,708 A | 10/1985 | Norris |
| 4,557,441 A | 12/1985 | Aspinall |
| 4,585,189 A | 4/1986 | Buxton |
| 4,629,146 A | 12/1986 | Lymons |
| 4,679,750 A | 7/1987 | Burhans |
| 4,683,717 A | 8/1987 | Naud et al. |
| 4,731,991 A | 3/1988 | Newton et al. |
| 4,894,985 A * | 1/1990 | Dubois et al. ............... 60/226.2 |
| 5,003,770 A | 4/1991 | Schegerin et al. |
| 5,076,514 A | 12/1991 | Melcher |
| 5,083,426 A | 1/1992 | Layland |

(Continued)

FOREIGN PATENT DOCUMENTS

EP 0926333 6/1999

(Continued)

OTHER PUBLICATIONS

U.S. Appl. No. 11/773,488, Welch et al.

*Primary Examiner*—Michael Cuff
*Assistant Examiner*—Phutthiwat Wongwian
(74) *Attorney, Agent, or Firm*—Perkins Coie LLP

(57) ABSTRACT

Aircraft systems including cascade thrust reversers are disclosed herein. An aircraft system in accordance with one embodiment includes a cascade thrust reverser having a fixed reverser ramp and a nozzle outer wall section at least partially aft of the fixed reverser ramp. The nozzle outer wall section is movable between a deployed position and a stowed position. The nozzle outer wall section includes a forward portion with a leading edge section. The fixed reverser ramp has a portion forward of and adjacent to the nozzle outer wall section when the nozzle outer wall section is in the stowed position. The portion of the fixed reverser ramp has a first slope. The forward portion of the nozzle outer wall section that is aft of the leading edge section has a second slope different than the first slope.

18 Claims, 4 Drawing Sheets

U.S. PATENT DOCUMENTS

| | | | |
|---|---|---|---|
| 5,090,197 A * | 2/1992 | Dubois | 60/226.2 |
| 5,112,242 A | 5/1992 | Choy et al. | |
| 5,239,822 A | 8/1993 | Buchacher | |
| 5,306,118 A | 4/1994 | Holmes et al. | |
| 5,307,623 A | 5/1994 | Antuna et al. | |
| 5,313,788 A * | 5/1994 | Wright et al. | 60/226.2 |
| 5,369,954 A | 12/1994 | Stuart | |
| 5,381,986 A * | 1/1995 | Smith et al. | 244/49 |
| 5,507,143 A * | 4/1996 | Luttgeharm et al. | 60/226.2 |
| 5,524,431 A | 6/1996 | Brusson et al. | |
| 5,655,360 A * | 8/1997 | Butler | 60/226.2 |
| 5,706,651 A | 1/1998 | Lillibridge et al. | |
| 5,778,659 A * | 7/1998 | Duesler et al. | 60/226.1 |
| 5,791,138 A | 8/1998 | Lillibridge et al. | |
| 5,794,434 A | 8/1998 | Szupkay | |
| 5,819,528 A | 10/1998 | Masson et al. | |
| 5,863,014 A | 1/1999 | Standish et al. | |
| 5,904,041 A | 5/1999 | Dhainault et al. | |
| 5,915,765 A | 6/1999 | Sternberger | |
| 5,943,856 A | 8/1999 | Lillibridge et al. | |
| 5,983,625 A | 11/1999 | Gonidec et al. | |
| 5,987,880 A | 11/1999 | Culbertson | |
| 6,021,636 A | 2/2000 | Johnson et al. | |
| 6,032,901 A | 3/2000 | Carimali et al. | |
| 6,036,238 A | 3/2000 | Lallament | |
| 6,059,231 A | 5/2000 | Dessenberger, Jr. | |
| 6,065,285 A | 5/2000 | Gonidec et al. | |
| 6,145,786 A | 11/2000 | Baudu et al. | |
| 6,148,607 A | 11/2000 | Baudu et al. | |
| 6,151,886 A | 11/2000 | Vauchel et al. | |
| 6,170,254 B1 * | 1/2001 | Cariola | 60/226.2 |
| 6,173,807 B1 | 1/2001 | Welch et al. | |
| 6,189,832 B1 | 2/2001 | Jackson | |
| 6,220,546 B1 | 4/2001 | Klamka et al. | |
| 6,227,485 B1 | 5/2001 | Porte et al. | |
| 6,237,325 B1 * | 5/2001 | Hogie et al. | 60/226.2 |
| 6,293,495 B1 | 9/2001 | Aten et al. | |
| 6,340,135 B1 | 1/2002 | Barton | |
| 6,517,027 B1 | 2/2003 | Abruzzese et al. | |
| 6,546,715 B1 | 4/2003 | Blevins et al. | |
| 6,568,172 B2 | 5/2003 | Jannetta et al. | |
| 6,764,045 B2 | 7/2004 | Sternberger | |
| 6,895,742 B2 | 5/2005 | Lair et al. | |
| 6,945,031 B2 | 9/2005 | Lair | |
| 7,124,981 B2 | 10/2006 | Parham | |
| 2003/0066284 A1 | 4/2003 | Chakkera et al. | |
| 2004/0068978 A1 | 4/2004 | Lair et al. | |
| 2004/0159741 A1 * | 8/2004 | Sternberger et al. | 244/110 B |
| 2004/0206066 A1 | 10/2004 | Eschborn | |
| 2006/0059886 A1 | 3/2006 | Strunk et al. | |
| 2007/0007388 A1 | 1/2007 | Harrison et al. | |
| 2007/0084964 A1 | 4/2007 | Sternberger | |
| 2008/0098720 A1 | 5/2008 | Watson | |

FOREIGN PATENT DOCUMENTS

FR         2711187        4/1995

* cited by examiner

AIRCRAFT SYSTEMS INCLUDING CASCADE THRUST REVERSERS

TECHNICAL FIELD

The present invention is related to aircraft systems having cascade thrust reversers.

BACKGROUND

Jet aircraft, such as commercial passenger and military aircraft, include nacelles for housing the jet engines. The nacelles couple the engines to the wings and include thrust reversers to reduce the aircraft's speed after landing. FIG. 1 is a schematic illustration of a section of an aft portion of a conventional nacelle 10. The nacelle 10 includes a fan casing 20 and a thrust reverser 30 aft of the fan casing 20. The fan casing 20 has a nozzle outer wall section 22 and a nozzle inner wall section 24 positioned radially inward of the outer wall section 22. The thrust reverser 30 includes a nozzle outer wall section 40 and a nozzle inner wall section 50 positioned radially inward of the outer wall section 40. The nozzle outer wall sections 22 and 40 and the nozzle inner wall sections 24 and 50 of the fan casing 20 and thrust reverser 30 define a nozzle 58 through which fan gas flows to produce forward thrust. The nozzle outer wall section 40 in the thrust reverser 30 includes a forward portion 42 with a leading edge section 44 and a blocker door 46. The blocker door 46 is movable between a stowed position (shown in FIG. 1) and a deployed position.

The conventional thrust reverser 30 further includes a translating cowling 32 coupled to the nozzle outer wall section 40 and a plurality of guide vanes 70 positioned operably between the translating cowling 32 and the nozzle outer wall section 40. The translating cowling 32 and the nozzle outer wall section 40 are movable as a unit between a stowed position (shown in FIG. 1) and a deployed position. In the deployed position, the cowling 32 and the outer wall section 40 are positioned aft of the guide vanes 70 so that the guide vanes 70 are exposed to gas flow in the nozzle 58 and the ambient environment. When the cowling 32, outer wall section 40, and blocker door 46 are in the deployed position, the blocker door 46 obstructs gas flow through the nozzle 58 so that at least a portion of the flow is diverted radially outward through the guide vanes 70. When the cowling 32, outer wall section 40, and blocker door 46 are in the stowed position, fan gas flows through the nozzle 58 to produce forward thrust. The nozzle outer wall section 22 of the fan casing 20 and the nozzle outer wall section 40 of the thrust reverser 30 form a generally smooth flow line and aerodynamically continuous surface to maximize the forward thrust produced by the engine. More specifically, at the transition between the fan casing 20 and the thrust reverser 30, the leading edge section 44 and/or the forward portion 42 of the nozzle outer wall section 40 is generally aligned with and parallel to the nozzle outer wall section 22 when the nozzle outer wall section 40 is in the stowed position.

One drawback of conventional thrust reversers is that they require large actuators and tracks for moving the translating cowlings and the nozzle outer wall sections between the stowed and deployed positions. The actuators and tracks are heavy and require significant space within the nacelle. Typically, the tracks project from the cowling and so the nacelle includes a fairing to enclose the tracks. The track fairing and the weight of the components reduces the performance of the aircraft nacelle. Therefore, a need exists to reduce the weight and size of a thrust reverser's actuator and tracks.

SUMMARY

Several aspects of the invention are directed to aircraft systems including cascade thrust reversers. An aircraft system in accordance with one embodiment includes a cascade thrust reverser having a fixed reverser ramp and a nozzle outer wall section at least partially aft of the fixed reverser ramp. The nozzle outer wall section is movable between a deployed position and a stowed position. The nozzle outer wall section includes a forward portion with a leading edge section. The fixed reverser ramp has a portion forward of and adjacent to the nozzle outer wall section when the nozzle outer wall section is in the stowed position. The portion of the fixed reverser ramp has a first slope. The forward portion of the nozzle outer wall section that is aft of the leading edge section has a second slope different than the first slope.

The leading edge section of the nozzle outer wall section has a third slope that can be generally the same as or different than the first slope. In one aspect of this embodiment, the forward portion of the nozzle outer wall section and the fixed reverser ramp define a pit that generates excrescence in the nozzle. In another aspect of this embodiment, the aircraft system further includes a wing coupled to the thrust reverser, a fuselage attached to the wing, and a tail coupled to the fuselage.

In another embodiment, an aircraft system includes a thrust reverser and a fan casing coupled to the thrust reverser. The thrust reverser includes a nozzle outer wall section configured to move between a first position and a second position aft of the first position. The nozzle outer wall section includes a forward portion with a first slope along an axis. The fan casing includes a nozzle outer wall section having an aft portion with a second slope along the axis. The first slope is different than the second slope.

In one aspect of this embodiment, the forward portion of the nozzle outer wall section in the thrust reverser includes a leading edge, and the thrust reverser further includes a fixed reverser ramp having a portion forward of and adjacent to the leading edge. The portion of the fixed reverser ramp has a third slope different than the first slope when the nozzle outer wall section is in the first position. In another aspect of this embodiment, the fixed reverser ramp includes a forward section in the fan casing or the thrust reverser and an aft section in the thrust reverser.

In another embodiment, an aircraft system includes a thrust reverser having a fixed reverser ramp and a nozzle outer wall section at least partially aft of the fixed reverser ramp. The nozzle outer wall section is movable between a deployed position and a stowed position. The nozzle outer wall section includes a forward portion with a leading edge section. When the nozzle outer wall section is in the stowed position, the forward portion of the nozzle outer wall section is positioned such that a forward axial projection of the forward portion intersects the fixed reverser ramp non-tangentially.

DETAILED DESCRIPTION

The following disclosure describes aircraft systems having cascade thrust reversers. The term "transverse" is used throughout to mean oblique, perpendicular, and/or not parallel. Certain details are set forth in the following description and in FIGS. 2-5 to provide a thorough understanding of various embodiments of the invention. Other details describing well-known structures and systems often associated with thrust reversers are not set forth in the following disclosure to avoid unnecessarily obscuring the description of various embodiments of the invention.

Many of the details, dimensions, angles, and other features shown in the figures are merely illustrative of particular embodiments of the invention. Accordingly, other embodiments can have other details, dimensions, and/or features without departing from the spirit or scope of the present invention. In addition, further embodiments of the invention may be practiced without several of the details described below, or various aspects of any of the embodiments described below can be combined in different combinations.

A. Embodiments of Aircraft Systems Having Cascade Thrust Reversers

Figure 1:
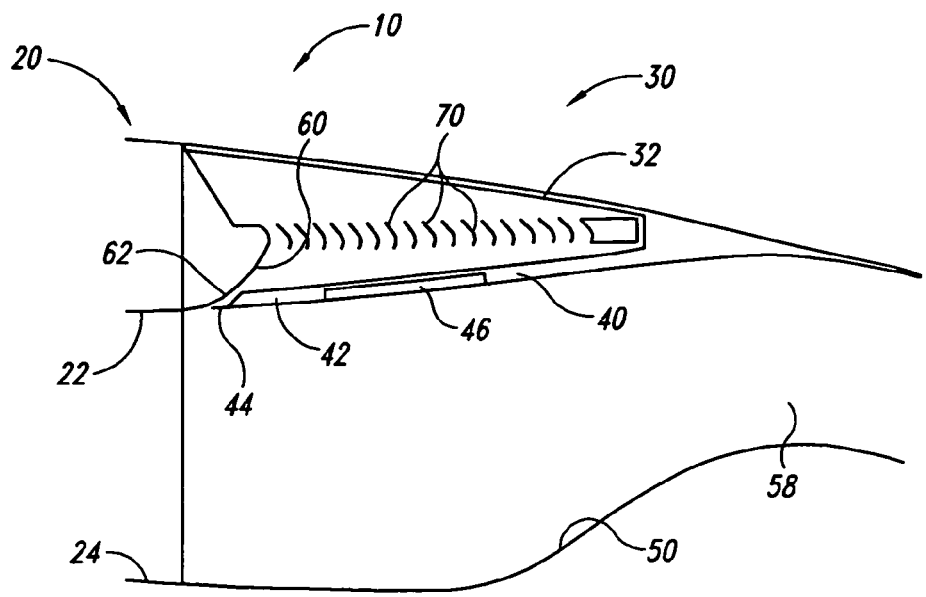
FIG. 1 is a schematic illustration of a section of a conventional nacelle.
Figure 2:
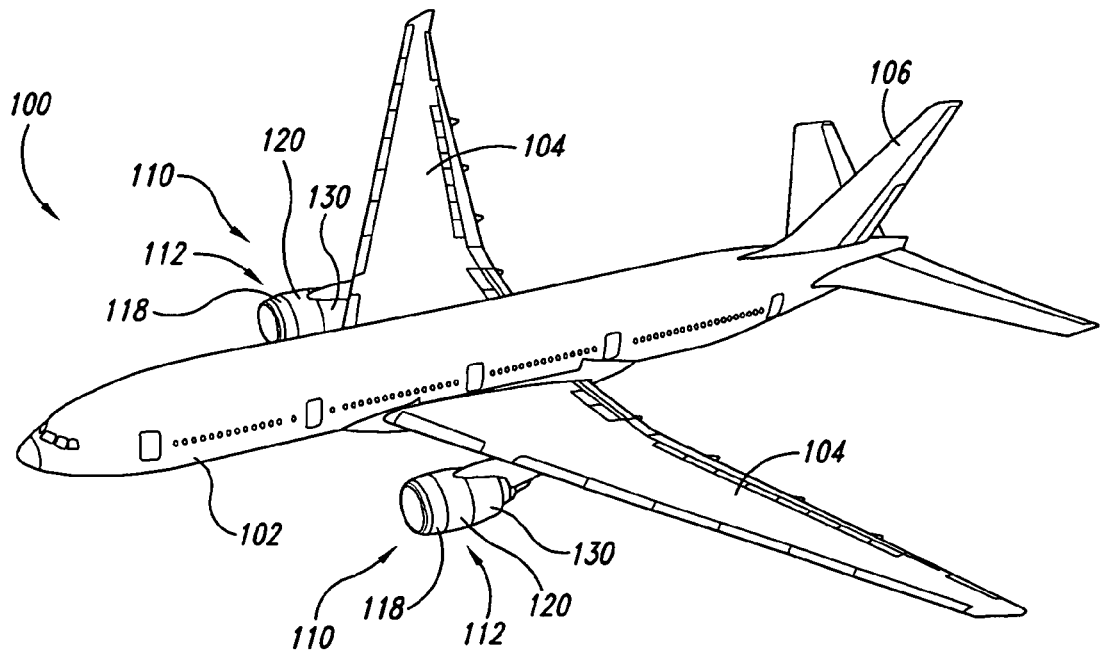
FIG. 2 is a schematic isometric view of an aircraft having a plurality of power plants in accordance with one embodiment of the invention.

FIG. 2 is a schematic isometric view of an aircraft 100 having a plurality of power plants 110 in accordance with one embodiment of the invention. The aircraft 100 further includes a fuselage 102, a plurality of wings 104 attached to the fuselage 102, and a tail 106 attached to the fuselage 102. Although the illustrated power plants 110 are mounted to corresponding wings 104, in other embodiments, the power plants 110 can be coupled to the fuselage 102 and/or the tail 106. The individual power plants 110 include an inlet housing 118, a fan casing 120 coupled to the inlet housing 118, and a thrust reverser 130 coupled to the fan casing 120.

Figure 3:
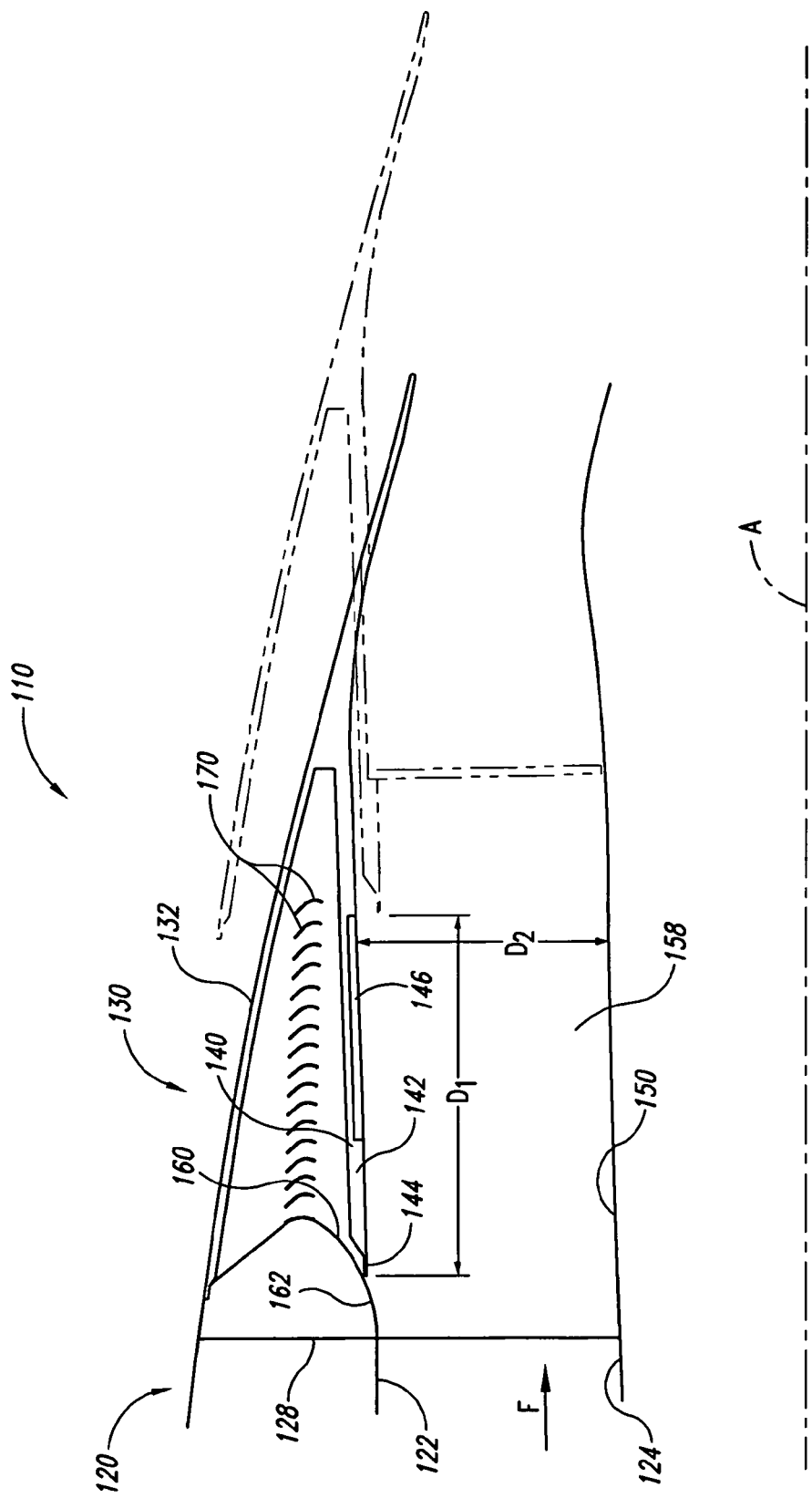
FIG. 3 is a schematic view of a portion of the power plant of FIG. 2.

FIG. 3 is a schematic view of a portion of one of the power plants 110 illustrated in FIG. 2. The illustrated fan casing 120 includes a nozzle outer wall section 122 and a nozzle inner wall section 124 positioned radially inward of the outer wall section 122. The illustrated thrust reverser 130 includes a nozzle outer wall section 140 and a nozzle inner wall section 150 positioned radially inward of the outer wall section 140. The nozzle outer wall sections 122 and 140 and the nozzle inner wall sections 124 and 150 of the fan casing 120 and thrust reverser 130 define a nozzle 158 through which fan gas flows in a direction F to produce forward thrust for the power plant 110. The nozzle 158 is positioned radially outward from an axis of symmetry A of the power plant 110. As described in greater detail below, the illustrated nozzle outer wall section 140 is spaced radially outward and aft relative to conventional thrust reverser nozzle outer wall sections. Consequently, the area of the nozzle 158 between the thrust reverser nozzle outer and inner wall sections 140 and 150 is greater than the corresponding area in conventional thrust reversers.

In the illustrated embodiment, the thrust reverser nozzle outer wall section 140 has a forward portion 142 with a leading edge section 144 and a blocker door 146. The blocker door 146 is movable between a stowed position (shown in solid lines) and a deployed position (shown in broken lines). The illustrated thrust reverser 130 further includes a translating cowling 132 coupled to the nozzle outer wall section 140 and a plurality of guide vanes 170 positioned between the translating cowling 132 and the nozzle outer wall section 140.

The translating cowling 132 and the nozzle outer wall section 140 are movable as a unit between a stowed position (shown in solid lines) and a deployed position (shown in broken lines). When the nozzle outer wall section 140 and the blocker door 146 are in the stowed position, the nozzle outer wall section 140 directs gas aftward to produce forward thrust. When the translating cowling 132, the nozzle outer wall section 140, and the blocker door 146 are in the deployed position, the guide vanes 170 are exposed to gas flow in the nozzle 158 and the blocker door 146 obstructs gas flow through the nozzle 158 so that at least a portion of the flow is diverted radially outward through the guide vanes 170. The guide vanes 170 change the direction of the gas flow to generate reverse thrust to assist in decelerating the aircraft 100 (FIG. 2). Although the illustrated thrust reverser 130 has an aft blocker door configuration, in other embodiments, the thrust reverser may include a forward blocker door configuration.

Figure 4:
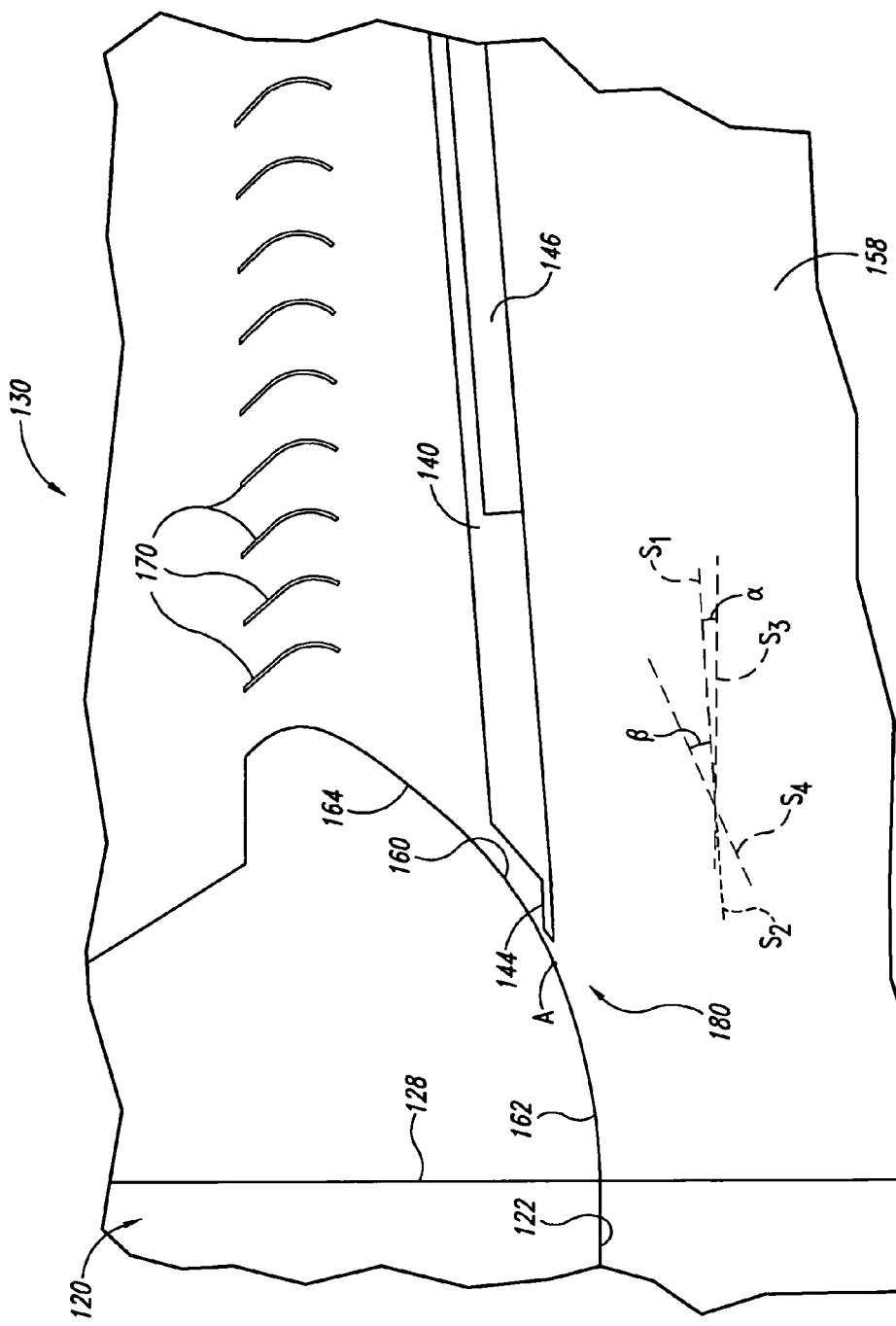
FIG. 4 is an enlarged schematic view of a forward portion of a nozzle outer wall section in the power plant of FIG. 2.

FIG. 4 is an enlarged schematic view of the forward portion 142 of the nozzle outer wall section 140 of FIG. 3. The forward portion 142 aft of the leading edge section 144 has an inner surface contour with a first slope $S_1$, and the leading edge section 144 has an inner surface contour with a second slope $S_2$ the same as the first slope $S_1$. In other embodiments, such as the embodiment described below with reference to FIG. 5, the leading edge section 144 can have an inner surface contour with a slope that is not the same as the first slope $S_1$. The illustrated nozzle outer wall section 122 of the fan casing 120 has an inner surface contour with a third slope $S_3$ different than the first slope $S_1$ and oriented at an angle α relative to the first slope $S_1$ of the forward portion 142 when the thrust reverser nozzle outer wall section 140 is in the stowed position. In other embodiments, however, the thrust reverser nozzle outer wall section 140 and fan casing nozzle outer wall section 122 can be configured such that the first slope $S_1$ is generally the same as the third slope $S_3$.

The illustrated thrust reverser 130 further includes a bullnose fairing or fixed thrust reversers ramp 160 extending aftwardly and radially outwardly from the nozzle outer wall section 122 of the fan casing 120 toward the guide vanes 170. The thrust reverser ramp 160 has a forward portion 162 and an aft portion 164. The forward portion 162 forms an integral portion of the nozzle 158, and consequently, is exposed to fan gas flow through the nozzle 158 when the nozzle outer wall section 140 is in the stowed position. The aft portion 164 is exposed to fan gas flow when the nozzle outer wall section 140 is in the deployed position and at least a portion of the flow is directed radially outward through the guide vanes 170. In one embodiment, a point A at which the nozzle outer wall section 140 would intersect the thrust reverse ramp 160, if the inner surface of the nozzle outer wall section 140 were projected forward along the first slope $S_1$, divides the thrust reverser ramp 160 into the forward portion 162 and the aft portion 164. The forward portion 162 has an inner surface contour with a fourth slope $S_4$ at the point A that is oriented at an angle β and generally transverse to the first slope $S_1$ of the thrust reverser nozzle outer wall section 140.

The forward portion 162 of the fixed thrust reverser ramp 160 and the forward portion 142 of the nozzle outer wall section 140 define a pit 180, which can generate excrescence in the nozzle 158. Specifically, gas flows from the fan casing 120 around the curve defined by the forward portion 162 of the fixed thrust reverser ramp 160 and then along the forward portion 142 of the nozzle outer wall section 140. Accordingly, the transition between the fan casing nozzle outer wall section 122 and the forward portion 142 of the thrust reverser nozzle outer wall section 140 is at least partially aerodynamically discontinuous. Although the forward section of the illustrated thrust reverser ramp 160 is positioned at an interface 128 between the thrust reverser 130 and the fan casing 120, in other embodiments, the forward section of the thrust reverser ramp 160 can be positioned within the fan casing 120 or aft of the interface 128.

Referring back to FIG. 3, one feature of the illustrated thrust reverser 130 is that the thrust reverser nozzle outer wall section 140 (when in the stowed position) is spaced aft and radially outward relative to the corresponding walls in conventional thrust reversers. Because the thrust reverser nozzle outer wall section 140 is spaced aft relative to conventional walls, a stroke or distance $D_1$ between the deployed and stowed positions of the illustrated outer wall section 140 is less than the stroke of conventional walls. An advantage of the reduced stroke of the nozzle outer wall section 140 is that smaller actuators and tracks for moving the wall section 140 between the deployed and stowed positions can be used. For example, in several embodiments, the length of the tracks can be reduced by between one and two inches. In other embodiments, the length of the tracks can be reduced by less than one inch or more than two inches. In either case, reducing the size of the actuators and tracks reduces the weight and space required to house these components in the power plant 110. For example, the power plant 110 may utilize a smaller size fairing for enclosing the tracks. The reduction in the weight and size of these components increases the performance of the power plant 110.

The spacing of the illustrated thrust reverser nozzle outer wall section 140 radially outward relative to corresponding walls in conventional thrust reversers increases a distance $D_2$ between the nozzle outer wall section 140 and the nozzle inner wall section 150, which increases the area of the nozzle 158 between the nozzle outer and inner wall sections 140 and 150. The increased area of the nozzle 158 reduces the velocity of the gas flowing through the nozzle 158, which in turn, reduces the losses in the gas flow due to skin friction along the nozzle outer and inner wall sections 140 and 150. The inventors expect that the losses due to the aerodynamic discontinuity at the transition between the fan casing nozzle outer wall section 122 and the forward portion 142 of the thrust reverser nozzle outer wall section 140 are offset by the reduction in the skin friction of the gas flowing through the nozzle 158. Specifically, the losses caused by the flow of the gas around the forward portion 162 of the fixed thrust reverser ramp 160 and through the pit 180 are generally offset by the reduction in the skin friction of the gas flowing through the nozzle 158. As such, the illustrated thrust reverser 130 reduces the weight of the power plant 110 without a significant adverse effect on the thrust.

B. Additional Embodiments of Cascade Thrust Reversers

Figure 5:
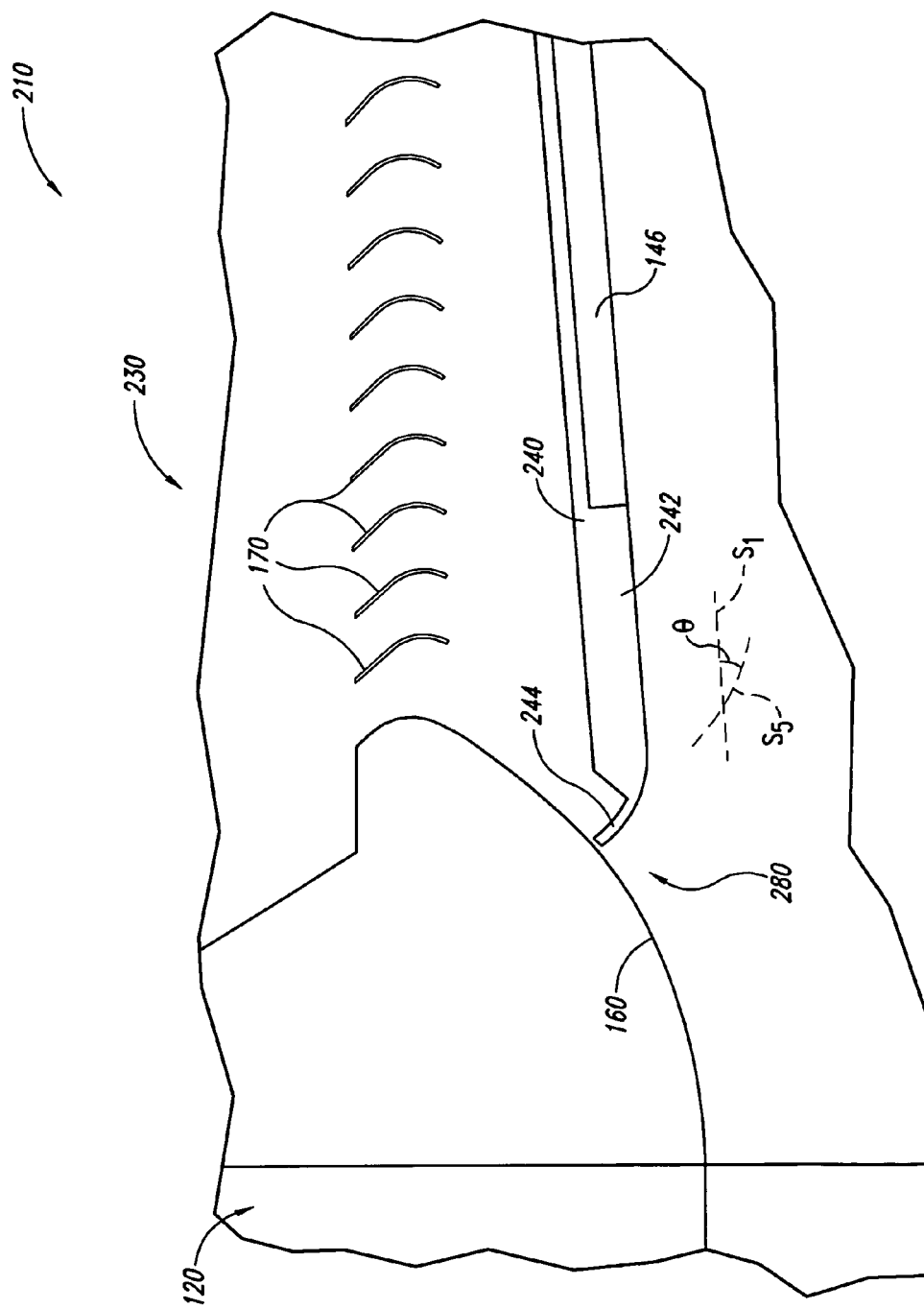
FIG. 5 is a schematic enlarged view of a portion of a power plant in accordance with another embodiment of the invention.

FIG. 5 is a schematic enlarged view of a portion of a power plant 210 configured in accordance with another embodiment of the invention. The illustrated power plant 210 includes a thrust reverser 230 generally similar to the thrust reverser 130 described above with reference to FIGS. 3 and 4. The illustrated thrust reverser 230, however, includes a nozzle outer wall section 240 having a forward portion 242 with an arcuate leading edge section 244. The forward portion 242 has an inner surface contour with a first slope $S_1$ aft of the leading edge section 244, and the leading edge section 244 has an inner surface contour with a fifth slope $S_5$ oriented at an angle θ generally transverse to the first slope $S_1$. The arcuate leading edge section 244 projects forwardly and radially outwardly and defines, along with the fixed thrust reverser ramp 160, a pit 280. One advantage of the illustrated thrust reverser 230 is that the curvature of the leading edge section 244 allows the nozzle outer wall section 240 to be spaced aft and radially outward relative to corresponding walls in conventional thrust reversers.

From the foregoing, it will be appreciated that specific embodiments of the invention have been described herein for purposes of illustration, but that various modifications may be made without deviating from the invention. Moreover, aspects of the invention described in the context of particular embodiments may be combined or eliminated in other embodiments. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited, except as by the appended claims.

We claim:

1. An aircraft system, comprising a cascade thrust reverser including:
   a fixed reverser ramp;
   a nozzle outer wall section at least partially aft of the fixed reverser ramp, the nozzle outer wall section being movable between a deployed position and a stowed position, the nozzle outer wall section including a forward portion with a radially inwardly facing inner surface having a leading edge section, wherein at least a segment of the inner surface of the forward portion is at least generally planar; and
   a blocker door coupled to the nozzle outer wall section, wherein in the stowed position of the nozzle outer wall section the blocker door is at least generally parallel to the inner surface, and in the deployed position of the nozzle outer wall section the blocker door is at least generally perpendicular to the inner surface;
   wherein in the stowed position of the nozzle outer wall section the fixed reverser ramp has a portion forward of and adjacent to the nozzle outer wall section, the portion of the fixed reverser ramp having a first slope; and
   wherein the forward portion of the nozzle outer wall section has a second slope aft of the leading edge section, the second slope being different than the first slope, and wherein the at least generally planar segment of the inner surface lies in a plane that intersects the reverser ramp.

2. The aircraft system of claim 1, further comprising a fan casing including a nozzle outer wall section having an aft portion with a third slope different than the first slope.

3. The aircraft system of claim 1, further comprising a fan casing including a nozzle outer wall section, wherein the forward portion of the nozzle outer wall section of the thrust reverser and the fixed reverser ramp define a pit that is recessed radially outward from the nozzle outer wall section of the fan casing.

4. The aircraft system of claim 1, further comprising a fan casing including a nozzle outer wall section having an aft portion with a third slope at least generally similar to the first slope.

5. The aircraft system of claim 1 wherein the leading edge section has a third slope different than the first slope.

6. The aircraft system of claim 1 wherein the leading edge section has a third slope at least generally the same as the first slope.

7. The aircraft system of claim 1, further comprising:
   a wing coupled to the thrust reverser;
   a fuselage attached to the wing; and
   a tail coupled to the fuselage.

8. An aircraft system, comprising:

a thrust reverser including a nozzle outer wall section configured to move between a first position and a second position aft of the first position, the nozzle outer wall section including a radially inwardly facing inner surface having a forward portion with a first slope along an axis, wherein at least a segment of the forward portion is at least generally planar, and a blocker door, wherein in the first position of the nozzle outer wall section the blocker door is positioned at least generally parallel to the inner surface and in the second position of the nozzle outer wall section the blocker door is at least generally transverse to the inner surface; and a fan casing coupled to the thrust reverser, the fan easing including a nozzle outer wall section having an aft portion with a second slope along the axis, wherein the first slope is different than the second slope, and wherein the at least generally planar segment of the inner surface of the forward portion lies in a plane that intersects the aft portion of the nozzle outer wall section of the fan casing.

9. The aircraft system of claim 8 wherein:

the forward portion of the nozzle outer wall section in the thrust reverser includes a leading edge;

the thrust reverser further includes a fixed reverser ramp having a portion forward of and adjacent to the leading edge; and in the first position of the nozzle outer wall section the portion of the fixed reverser ramp has a third slope different than the first slope.

10. The aircraft system of claim 8 wherein:

the thrust reverser further includes a fixed reverser ramp having a portion radially inward of the forward portion of the nozzle outer wall section; and the portion of the fixed reverser ramp and the forward portion of the nozzle outer wall section define a pit.

11. The aircraft system of claim 8, further comprising a fixed reverser ramp in the thrust reverser and aft of the fan casing.

12. The aircraft system of claim 8, further comprising a fixed reverser ramp having a forward section in the fan casing and an aft section in the thrust reverser.

13. The aircraft system of claim 8 wherein the forward portion of the nozzle outer wall section of the thrust reverser includes a leading edge section having a third slope different than the first slope, and wherein the first slope is the slope of a section of the forward portion aft of the leading edge section.

14. An aircraft system, comprising a cascade thrust reverser including:

a fixed reverser ramp; and a nozzle outer wall section at least partially aft of the fixed reverser ramp, the nozzle outer wall section being movable between a deployed position and a stowed position, the nozzle outer wall section including a forward portion with a radially inwardly facing inner surface having a leading edge section, and a blocker door, wherein in the stowed position of the nozzle outer wall section the blocker door is positioned at least generally parallel to the inner surface and in the deployed position of the nozzle outer wall section the blocker door is at least generally perpendicular to the inner surface, wherein at least a segment of the inner surface of the forward portion is at least generally planar;

wherein in the stowed position of the nozzle outer wall section, the forward portion of the nozzle outer wall section is positioned such that the at least generally planar segment of the inner surface of the forward portion lies in a plane that intersects the reverser ramp.

15. The aircraft system of claim 14 wherein the forward portion of the nozzle outer wall section has a first slope aft of the leading edge section, and wherein the system further comprises a fan casing including a nozzle outer wall section having an aft portion with a second slope at least generally similar to the first slope.

16. The aircraft system of claim 14 wherein the forward portion of the nozzle outer wall section has a first slope aft of the leading edge section, and wherein the system further comprises a fan casing including a nozzle outer wall section having an aft portion with a second slope different than the first slope.

17. The aircraft system of claim 14 wherein the forward portion of the nozzle outer wall section has a first slope aft of the leading edge section, and wherein the leading edge section has a second slope different than the first slope.

18. The aircraft system of claim 14 wherein the forward portion of the nozzle outer wall section has a first slope aft of the leading edge section, and wherein the leading edge section has an arcuate configuration and projects forwardly and outwardly.

* * * * *